(12) United States Patent
Nerone

(10) Patent No.: US 7,990,070 B2
(45) Date of Patent: Aug. 2, 2011

(54) LED POWER SOURCE AND DC-DC CONVERTER

(76) Inventor: Louis Robert Nerone, Brecksville, OH (US)

( * ) Notice: Subject to any disclaimer, the term of this patent is extended or adjusted under 35 U.S.C. 154(b) by 266 days.

(21) Appl. No.: 12/479,312

(22) Filed: Jun. 5, 2009

(65) Prior Publication Data

US 2010/0308751 A1 Dec. 9, 2010

(51) Int. Cl.
*H05B 41/16* (2006.01)
*H05B 41/24* (2006.01)

(52) U.S. Cl. ......... 315/247; 315/224; 315/291; 315/308

(58) Field of Classification Search .................... None
See application file for complete search history.

(56) References Cited

U.S. PATENT DOCUMENTS

| | | |
|---|---|---|
| 5,162,700 A | 11/1992 | Soileau |
| 5,475,285 A | 12/1995 | Konopka |
| 5,796,214 A | 8/1998 | Nerone |
| 5,917,289 A | 6/1999 | Nerone et al. |
| 6,078,143 A | 6/2000 | Nerone |
| 6,417,631 B1 | 7/2002 | Chen et al. |
| 6,429,604 B1 | 8/2002 | Chang |
| 6,509,696 B2 | 1/2003 | Bruning et al. |
| 6,815,908 B2 | 11/2004 | Glaser et al. |
| 6,836,077 B2 | 12/2004 | Nerone |
| 6,867,553 B2 | 3/2005 | Nerone et al. |
| 7,436,124 B2 | 10/2008 | Nerone et al. |
| 2002/0057584 A1* | 5/2002 | Brockmann ..................... 363/98 |
| 2004/0183380 A1 | 9/2004 | Otake |
| 2005/0184685 A1 | 8/2005 | Sekine et al. |
| 2006/0267513 A1 | 11/2006 | Morishita |
| 2007/0236159 A1* | 10/2007 | Beland .......................... 315/312 |
| 2010/0109571 A1* | 5/2010 | Nishino et al. ................ 315/307 |

FOREIGN PATENT DOCUMENTS

| | | |
|---|---|---|
| EP | 0 340 049 | 11/1989 |
| EP | 0 479 352 | 4/1992 |
| EP | 1868284 A1 | 12/2007 |
| JP | 61221581 A | 10/1986 |
| JP | 2216796 A | 8/1990 |
| WO | 9506350 A1 | 3/1995 |
| WO | 2008055545 A1 | 5/2008 |

OTHER PUBLICATIONS

PCT/US2010/31968, Search Report and Written Opinion, Jul. 21, 2010.

* cited by examiner

*Primary Examiner* — Anh Tran
(74) *Attorney, Agent, or Firm* — Fay Sharpe LLP

(57) ABSTRACT

Isolated LED power sources and DC-DC converters therefor are presented in which the DC-DC converter includes a self-oscillating inverter driving an output rectifier for operating an LED array of one or more LEDs, where the inverter uses a control transformer with core having a Curie temperature set to a maximum operating temperature of one or more power supply components to reduce inductances of secondary windings in the inverter oscillation circuitry to lower the power supplied to the load so as to prevent the inverter from overheating.

20 Claims, 3 Drawing Sheets

LED POWER SOURCE AND DC-DC CONVERTER

BACKGROUND OF THE DISCLOSURE

Light emitting diodes (LEDs) are becoming more and more popular for lighting and signaling applications, in which multiple LEDs are formed into an array and powered to emit light. LED arrays are typically supplied with DC current with the amount of supplied power controlling the array brightness. In many applications, it is desirable to maintain electrical isolation between the LED array and the input power supply, such as where installers may ground the LED array to earth ground. Moreover, it is desirable to avoid thermal excesses in the LED power source. A need therefore exists for improved LED power sources and DC-DC converters that provide isolation and self-protection against overheating.

SUMMARY OF THE DISCLOSURE

An LED power source is provided along with a self oscillating DC-DC converter therefor, which can be employed for operating an LED array. The power source includes an input rectifier which receives an input AC voltage signal and produces an initial DC voltage received by the DC-DC converter. In one embodiment, the power source includes a boost converter operatively coupled between the input rectifier and the DC-DC converter, which may have a power factor correction controller to control a power factor of the power source. The DC-DC converter has isolated supply-side and load-side ground connections as well as a self-oscillating inverter and an output rectifier. The inverter is coupled with the supply-side ground connection and receives the initial DC voltage directly or indirectly from the input rectifier and produces an intermediate AC signal. The output rectifier is coupled with the load-side ground connection and receives the intermediate AC signal from which it produces an output DC voltage to supply power to the LED array. The DC-DC converter may further include an inverter controller that modifies the inverter frequency to control the supplied power based at least in part on sensed output power draw, where the inverter controller is electrically isolated from the inverter in some embodiments. The DC-DC converter may be controlled using a control transformer with a primary winding operatively coupled to and controlled by the inverter controller, as well as secondary windings that control the inverter switching frequency. The transformer in some embodiments has a core made of a material having a Curie temperature associated with a maximum operating temperature of a component in the power source, where the control transformer reduces the inductance of the secondary windings when the core temperature exceeds the Curie temperature to prevent the power source from overheating.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
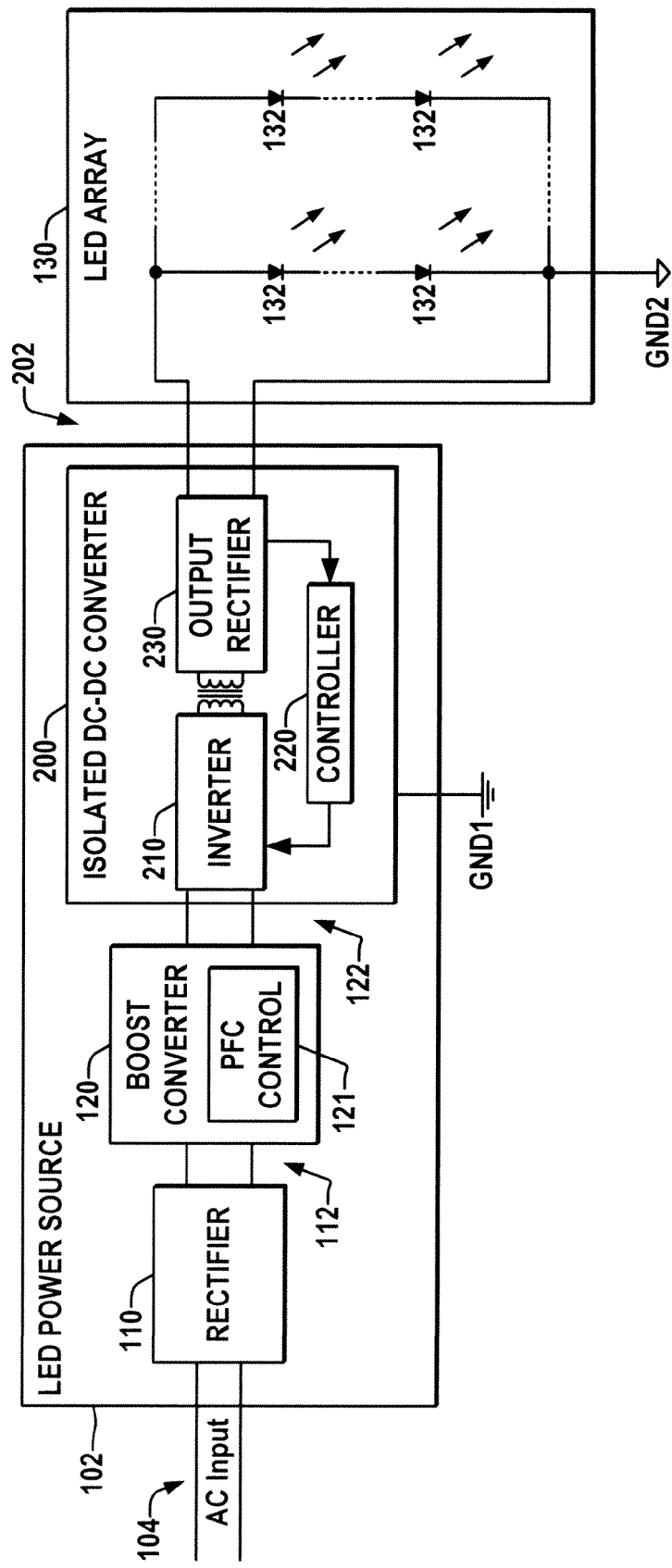
FIG. 1 is a schematic diagram illustrating an exemplary LED power source having a self-oscillating isolated DC-DC converter for powering an LED array.

Referring now to the drawings, where like reference numerals are used to refer to like elements throughout, and wherein the various features are not necessarily drawn to scale. FIG. 1 illustrates an LED power source 102 including a rectifier 110 receiving input power from an AC input 104, where the rectifier can be active or passive or the power source 102 can alternatively be supplied with DC input power with the rectifier omitted. The rectifier 110 has an output 112 providing a rectified DC voltage to a switching type DC-DC converter 120, which includes various switching devices operated by suitable control signals (not shown). In one embodiment, the converter 120 is a boost converter with a power factor control (PFC) component 121 to control the power factor of the ballast 102. In certain embodiments, the initial converter 120 may be omitted, with the rectifier (or external DC supply) providing the DC voltage 122.

The LED power source 102 further includes a self-oscillating isolated DC-DC converter 200 that is comprised of an inverter 210 receiving the DC voltage 122 and generating an intermediate AC, and a controller 220 that controls the inverter 210. The inverter 210 is transformer coupled to provide isolated AC power to an output rectifier 230. The output rectifier converts the intermediate AC to provide a DC power output 202 for driving an LED array load 130, which may include any number of LEDs 132 arranged in any suitable series and/or parallel configuration. The exemplary controller 220 senses one or more conditions at the output rectifier 230 and selectively modifies operation of the inverter 210 accordingly.

Figure 2:
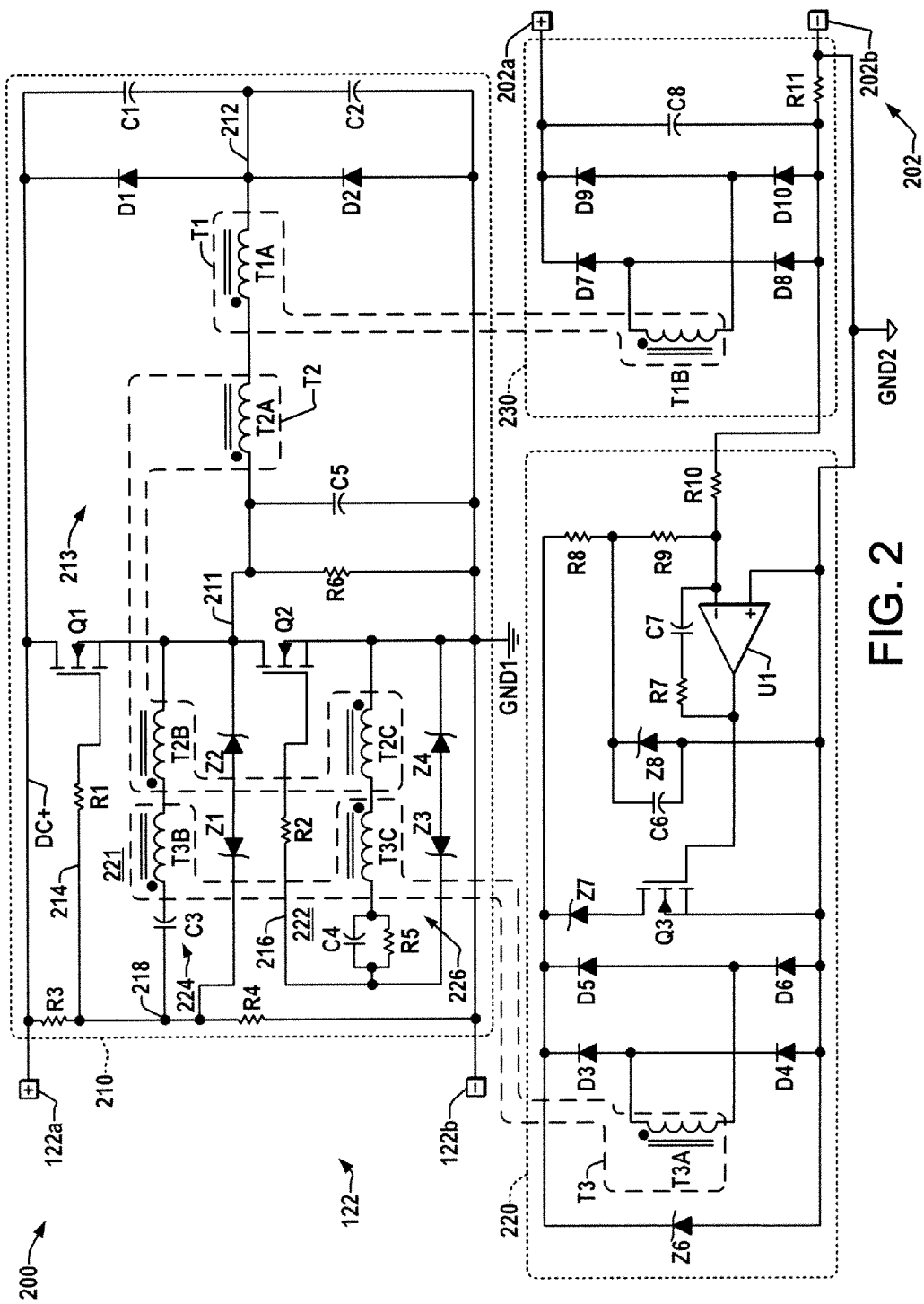
FIG. 2 is a schematic diagram illustrating details of an exemplary self-oscillating isolated DC-DC converter.

Referring also to FIG. 2, further details of an embodiment of a self-oscillating isolated DC-DC converter 210 are illustrated. The exemplary DC-DC converter 200 of FIG. 2 may be advantageously employed in the LED power source 102 of FIG. 1 above, and may be employed in any system in which isolated DC-DC conversion is required. As shown in FIG. 2, the DC-DC converter 200 includes an inverter 210 having terminals 210a and 210b that receive DC power from the boost converter 120 or other preceding DC supply. The inverter 210, moreover, includes a resonant circuit 213 and a pair of resonance controlled switching devices Q1 and Q2, in one example, n-type MOSFETs although any suitable switching devices may be employed. The inverter receives DC input voltage via the terminals 210a and 210b and this input DC is selectively switching by the switching devices Q1 and Q2 coupled in series between a positive voltage node DC+ and a negative node coupled to a first circuit ground GND1. In operation, the selective switching of the switches Q1 and Q2 operates to generate a square wave at an inverter output node 211 which in turn excites the resonant circuit 213 to thereby drive a high frequency bus 212.

The converter 200 includes transformers for power and control isolation, as well as for self-oscillation. These include a first transformer T1 with a winding T1A in the resonant circuit 213 and a winding T1B in the output rectifier circuit 230, a second transformer T2 having a first winding T2A in series with the winding T1A in the resonant circuit 213 and second and third windings T2B and T2C in switch control circuits associated with the first and second switching devices Q1 and Q2, respectively, as well as a third transformer T3 with a first winding T3A in the controller 220 and second and third windings T3B and T3C in the switch control circuits associated with Q1 and Q2. In operation, the first transformer T1 provides AC power from the high frequency bus 212 to the secondary winding T1B of the output rectifier 230, and the secondary current from T1B is rectified to provide output power at terminals 202a and 202b for driving the LED array 130 with power isolated from the first circuit ground GND1, where the negative output terminal 202b provides an output ground GND2 that is isolated from the first circuit ground GND1 via the first transformer T1. The first winding T2A of the second transformer operates as a primary in the resonant circuit 213 and the secondary windings T2B and T2C are connected in the gate drive circuits for Q1 and Q2, respectively for oscillatory actuation of the switches according to the resonance of the circuit 213. The third transformer T3 is used by the controller 220 to selectively control the inductance of the gate drive circuits for closed loop operation of the converter 200, in one example, to control the LED array output current.

The high frequency bus is generated at the node 212 by the inverter 210 and the resonant circuit 213, which includes a resonant inductance (e.g., the series connected windings T1A and T2A) as well as an equivalent resonant capacitance including the equivalent of capacitors C1 and C2 connected in series between the DC+ and GND1 nodes, with a center node at the high frequency bus 212. The inverter 210 also includes a clamping circuit formed by clamping diodes D1 and D2 individually coupled in parallel with the capacitances C1 and C2, respectively. The switches Q1 and Q2 are alternately activated to provide a square wave of amplitude VDC/2 at a common inverter output node 211 (e.g., half the DC bus voltage across the terminals 122a and 122b). The square wave output of the inverter 210 excites the resonant circuit 213. Gate or control lines 214 and 216 include resistances R1 and R2 for providing control signals to the gates of the inverter switches Q1 and Q2, respectively.

The switch gating signals are generated using first and second gate drive circuits 221 and 222, respectively, with the first drive circuit 221 coupled between the inverter output node 211 and a first circuit node 218, and the second drive circuit 222 coupled between the circuit ground GND1 and node 216. The drive circuits 221 and 222 respectively include the first and second driving inductors T2B and T2C which are secondary windings mutually coupled to the resonant inductor T2A of the resonant circuit 213 to induce voltage in the driving inductors T2B and T2C proportional to the instantaneous rate of change of current in the resonant circuit 213 for self-oscillatory operation of the inverter 210. In addition, the drive circuits 221 and 222 include the secondary inductors T3B and T3C serially connected to the respective first and second driving inductors T2B and T2C and the gate control lines 214 and 216, where the controller 220 can change the oscillatory frequency of the inverter 210 by varying the inductance of the windings T3B and T3C through control of the current through the primary winding T3A.

In operation, the gate drive circuits 221 and 222 maintain Q1 in an "ON" state for a first half of a cycle and the switch Q2 "ON" for a second half of the cycle to generate a generally square wave at the output node 211 for excitation of the resonant circuit 213. The gate to source voltages Vgs of the switching devices Q1 and Q2 in one embodiment are limited by bi-directional voltage clamps Z1, Z2 and Z3, Z4 (e.g., back-to-back Zener diodes) coupled between the respective switch sources and the gate control lines 214 and 216. In this embodiment, the individual bi-directional voltage clamp Z1, Z2 and Z3, Z4 cooperate with the respective inductor T3B and T3C to control the phase angle between the fundamental frequency component of voltage across the resonant circuit 213 and the AC current in the resonant inductor T2A.

To start the converter 200, series coupled resistors R3 and R4 across the input terminals 122a and 122b cooperate with a resistor R6 (coupled between the inverter output node 211 and the circuit GND1) to initiate regenerative operation of the gate drive circuits 221 and 222. In addition, the inverter switch control circuitry includes capacitors C3 and C4 coupled in series with the windings T3B and T3C, respectively. Upon application of DC power, C3 is charged from the positive DC input via R3, R4 and R6. During this time, a resistor R5 shunts the capacitor C4 to prevent C4 from charging and thereby prevents concurrent activation of Q1 and Q2. Since the voltage across C3 is initially zero, the series connected inductors T2B and T3B act as a short circuit due to a relatively long time constant for charging of the capacitor C3. Once C3 charges up to the threshold voltage of the Vgs of Q1, (e.g., 2-3 volts in one embodiment), Q1 turns ON and a small bias current flows through Q1. This current biases Q1 in a common drain, Class A amplifier configuration having sufficient gain to allow the combination of the resonant circuit 213 and the gate control circuit 221 to produce a regenerative action to begin oscillation of the inverter 210 at or near the resonant frequency of the network including C3 T3B and T2B, which is above the natural resonant frequency of the resonant circuit 213. As a result, the resonant voltage seen at the high frequency bus node 212 lags the fundamental of the inverter output voltage at node 211, thereby facilitating soft-switching operation of the inverter 210. The inverter 210 therefore begins operation in a linear mode at startup and transitions into switching Class D mode.

In steady state operation of the LED power source 102 circuit, the square wave voltage at the inverter output node 211 has an amplitude of approximately one-half of the voltage of the positive terminal 122a (e.g. Vdc/2), and the initial bias voltage across C3 drops. In the illustrated inverter a first network 224 including the capacitor C3 and inductor T3B and a second network 226 including the capacitor C4 and inductor T3C are equivalently inductive with an operating frequency above the resonant frequency of the first and second networks 224, 226. In steady state oscillatory operation, this results in a phase shift of the gate circuit to allow the current flowing through the inductor T2A to lag the fundamental frequency of the voltage produced at the inverter output node 211, thus facilitating soft-switching of the inverter 210 during the steady-state operation. The output voltage of the inverter 210 in one embodiment is clamped by serially connected clamping diodes D1, D2 to limit high voltage seen by the capacitors C1 and C2. As the inverter output voltage at node 211 increases, the clamping diodes D1, D2 start to clamp, preventing the voltage across the capacitors C1 and C2 from changing sign and limiting the output voltage to a value that prevents thermal damage to components of the inverter 210.

In steady state operation, therefore, the inverter 210 provides a high frequency bus at the common node 211 while maintaining the soft switching condition for Q1 and Q2. The high frequency current flowing through the primary winding T1A of the resonant circuit 213 is transformer coupled to the secondary winding T1B that drives a passive full wave rectifier bridge which includes diodes D7, D8, D9, and D10 in the output rectifier 230. Other forms of output rectifiers can be used, including active or passive, full or half-wave rectifiers, with or without filtering components. The exemplary output rectifier 230 includes an output filter capacitance C8 operative to smooth the rectified DC voltage from the diodes bridge D7-D10, and the resulting DC output voltage is provided at rectifier output terminals 202a and 202b, with the negative output terminal 202b forming an output ground GND2 as shown in FIG. 2. The output rectifier 230 also includes a sense resistance R11 coupled between the lower leg of the rectifier D7-D10 and the negative output terminal 202b, where the voltage across R11 is proportional to the DC current provided to the LED array 130 (or to other load) connected to the output terminals 202.

The controller circuit 220 senses this load current signal and operates to vary/control the inductance of the inverter windings T3B and T3C, and hence the operating frequency of the inverter 210 (by changing the loading seen by the tertiary winding T3A. In particular, as the frequency of the inverter 210 is decreased, the output current provided to the LED (sensed via resistor R11) will increase, and vice versa. The inverter frequency, moreover, decreases with decreased loading of T3A. Thus, the exemplary controller 220 of FIG. 2 operates to increase or decrease the loading on T3A to reduce or raise the LED current, respectively. The controller 220 includes an operational amplifier (OP-AMP) U1 with a non-inverting input coupled to the output ground GND2 and an inverting input receiving the LED current sensing signal from the output rectifier 230 via a resistor R10. Resistors R9 and R10 provide a reference to the non-inverting input based on the level set by a stabilized shunt regulator formed using zener Z8 and capacitance C6, and the stabilized reference node at R9 is connected via a resistor R8 to an upper terminal of a full bridge rectifier D3-D6 coupled to the tertiary winding T3A. A zener Z6 is coupled across the bridge D3-D6, and the loading of the bridge is controlled by a MOSFET Q3 series connected with a zener Z7 across the bridge output.

The amplifier U1 drives the gate of Q3 to perform proportional integral (PI) control via integrator feedback capacitance C7 and resistor R7 connected between the amplifier output and inverting input to reduce any difference between the established reference level and the LED current sense signal from the output rectifier 230. In general, the closed loop controller 220 thus increases the loading (increasing the gate signal to Q3) to decrease the inductance of the transformer windings T3B and T3C to thereby increase the inverter frequency and thus decrease the LED output current when the sensed LED current level is above the reference level, and vice versa when the sensed LED current level is below the reference level. The illustrated embodiment shows one exemplary controller 220, but other embodiments are possible in which the loading of a tertiary winding T3A is modified to control the output of the rectifier 230. The DC-DC converter 200 thus provides electrically isolated inverter input and rectifier output circuits 210 and 230 using the transformer T1 for isolated power transfer to the output load, together with isolated control via the transformer windings of T3, and self-oscillating operation using the resonant circuit 213 and the gate drive circuit coupling via T2.

In one embodiment, the inverter 210 is provided with an input DC bus level of about 450 volts at the terminals 122 and drives an LED array at a nominal voltage of around 63 volts with the inverter frequency being controlled in a range of around 120-160 kHz. In this example, the following exemplary components and values may be used: R1 and R2 10Ω; R3 and R4 2MΩ; R5 100 kΩ; R6 1 MΩ; R7 100Ω; R8 10 kΩ; R9 143 kΩ; R10 20 kΩ; R1 0.1Ω; C1 and C2 6.8 nF; C3 and C4 3.3 nF; C5 1 nF; C6 and C7 1 μF; C8 2×47 μF; T1A 2 mH; T1B 320 μH; T2A 150 μH; T2B and T2C 1.0 μH; T3A 1 mH; T3B and T3C 500 μH; D1 and D2 ED1F; D3-D6 1N4148; Z1 and Z3 TZM5239 9.1V; Z2 and Z4 TZM5250 20V; Z6 TZM5262 51V; Z7 TZM5231 5.1V; Z8 2.5V; Q1 and Q2 BSS165; Q3 BSS138; and U1 LMV931. By using the isolation transformers T1 and T3, the installed LED array can have its negative terminal connected to earth ground if desired, and this is fully isolated from the supply main and the circuit ground of the inverter 210 without requiring a separate power supply for isolation. Moreover, the self-oscillating features of the inverter 210 allows for robust startup and steady-state operation without requiring pulse width modulation (PWM) or frequency controller.

Figure 3:
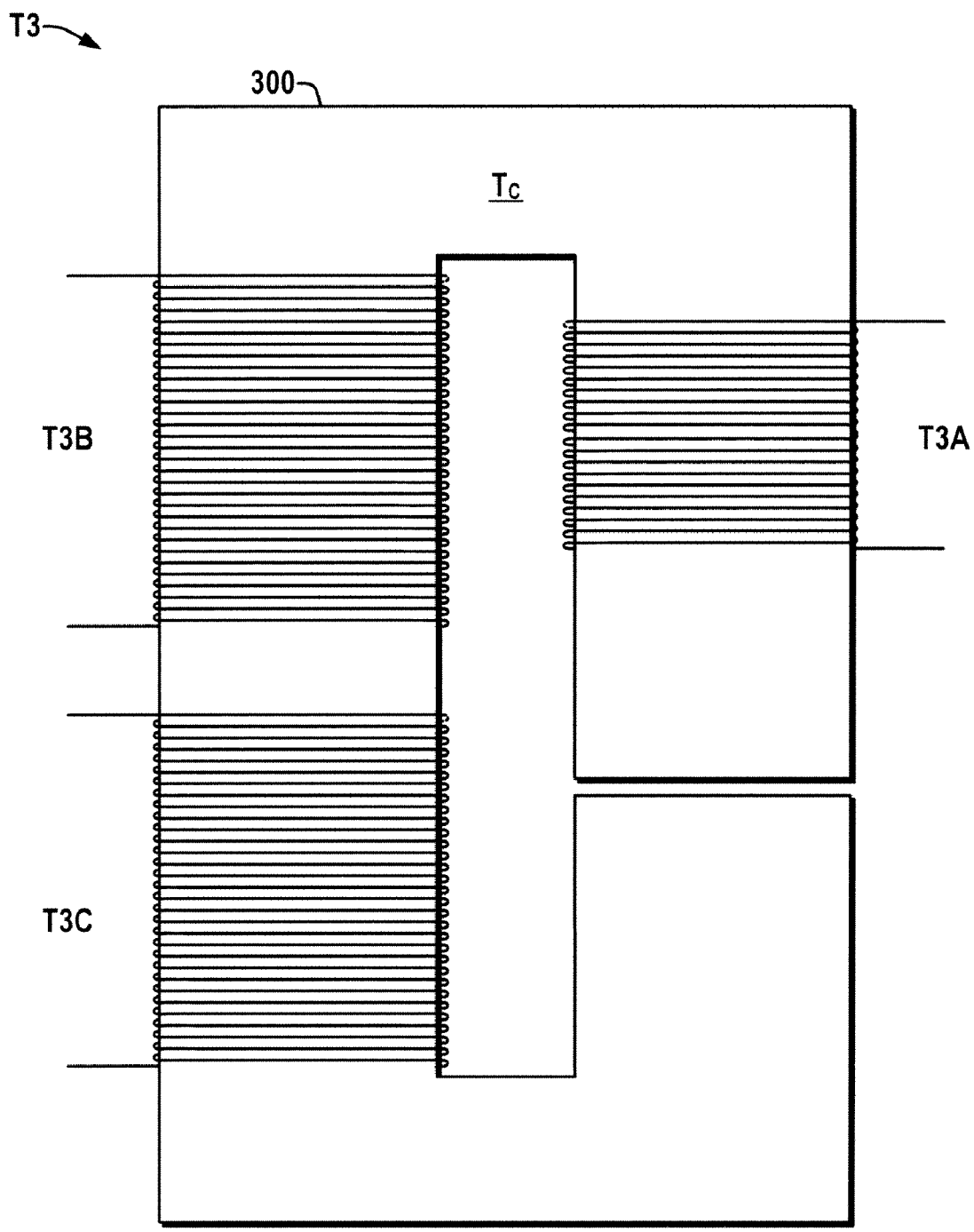
FIG. 3 is a side elevation view illustrating an exemplary control transformer with a core having a Curie temperature Tc set for thermal protection of the system and DC-DC converter of FIGS. 1 and 2.

Referring also to FIG. 3, the DC-DC converter may further include integral thermal protection incorporated into the isolated control configuration as described above. In certain embodiments, the transformer T3 has a ferromagnetic core 300 with a Curie temperature Tc set at a temperature threshold level corresponding to a desired thermal shutdown safety level for the DC-DC converter 200. For example, the threshold level may be set to 100 degrees C. or 125 degrees C. or other level corresponding to a limit above which one or more components of the converter 200 may be subject to thermal failure or degradation. In this embodiment, once the temperature of the core of T3 exceeds the threshold Tc, the core material becomes paramagnetic and the inductance of the inverter gate control circuit windings T3B and T3C decreases due to the Curie effect, thereby increasing the inverter frequency. This lowers the output power level, in turn reducing the temperature of T3, and the closed-loop control will stabilize at a lowered power operating point sufficient to prevent thermal degradation of the DC-DC converter 200. Thus, even in high ambient temperature operating conditions, the DC-DC converter 200 in this embodiment provides thermal self-protection.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. An LED power source for operating an LED array of one or more LEDs, the power source comprising:
    an input rectifier operative to receive an input AC voltage signal and to produce an initial DC voltage; and
    a DC-DC converter which is operatively coupled to the input rectifier to receive the initial DC voltage, the DC-DC converter comprising:
    a supply-side ground connection, a load-side ground connection electrically isolated from the supply side ground, a self-oscillating inverter operatively coupled to the supply-side ground connection and receiving the initial DC voltage, the inverter operative to produce an intermediate AC signal, and an output rectifier operatively coupled to receive the intermediate AC signal from the inverter and being coupled with the load-side ground connection, the output rectifier operative to produce an output DC voltage to supply power to the LED array;

wherein the inverter further comprises:
a feedback transformer comprising:
a primary winding, and
a first and second secondary winding operatively connected to the primary winding of the feedback transformer;
a resonant circuit comprising:
a signal-to-center capacitance operatively connected to the positive rail of the initial DC voltage,
a center-to-ground capacitance operatively connected between the signal-to-center capacitance and the supply-side ground connection, and
an inductance comprising the primary winding of the feedback transformer operatively connected to the junction of the signal-to-center capacitance and the center-to-ground capacitance;
a first gate control circuit comprising:
an inductance comprising the first secondary winding of the feedback transformer operatively connected to the inductance of the resonant circuit,
a capacitance operatively connected to the inductance of the first gate control circuit, and
a resistance operatively connected to the capacitance of the first gate drive circuit;
a second gate control circuit comprising:
an inductance comprising the second secondary winding of the feedback transformer operatively connected to the supply-side ground connection,
a capacitance and resistance in parallel operatively connected to the inductance of the second gate control circuit, and
a resistance operatively connected to the parallel capacitance-resistance of the second gate drive circuit; and
first and second switches operatively connected in series between the positive rail of the DC voltage and the supply-side ground connection, and the junction of the first and second switches is connected to the inductance of the resonant circuit, the first and second switches being controlled by the first and second gate control circuits respectively;
wherein the primary winding of the feedback transformer induces a voltage in the inductance of the first and second gate control circuits proportional to the instantaneous rate of change of current in the resonant circuit, the first and second gate control circuits alternatively switching the first and second switches operating to excite the resonant circuit.

2. The LED power source of claim 1, further comprising a boost converter operatively coupled between the input rectifier and the DC-DC converter, the boost converter receiving the initial DC voltage from the input rectifier and amplifying the initial DC voltage to provide an intermediate DC voltage, the inverter converting the intermediate DC voltage to produce the intermediate AC signal.

3. The LED power source of claim 2, wherein the boost converter further comprises a power factor correction controller to control a power factor of the power source.

4. An LED power source for operating an LED array of one or more LEDs, the power source comprising:
an input rectifier operative to receive an input AC voltage signal and to produce an initial DC voltage; and
a DC-DC converter which is operatively coupled to the input rectifier to receive the initial DC voltage, the DC-DC converter comprising:
a supply-side ground connection,
a load-side ground connection electrically isolated from the supply side ground,
a self-oscillating inverter operatively coupled to the supply-side ground connection and receiving the initial DC voltage, the inverter operative to produce an intermediate AC signal, and
an output rectifier operatively coupled to receive the intermediate AC signal from the inverter and being coupled with the load-side ground connection, the output rectifier operative to produce an output DC voltage to supply power to the LED array;
wherein the DC-DC converter further comprises an inverter controller operatively coupled to the inverter to modify a switching frequency of the inverter to control a frequency of the intermediate AC signal to control power supplied to the LED array based at least in part on a sensed power drawn by the LED array.

5. The LED power source of claim 4, wherein the inverter controller is electrically isolated from the inverter.

6. The LED power source of claim 4, wherein the DC-DC converter further comprises a control transformer comprising:
a primary winding operatively coupled to and controlled by the inverter controller;
a secondary winding operative to control the switching frequency of the inverter; and
a core operatively coupled to the primary winding and the secondary windings, the core comprising a core material having a Curie temperature associated with a maximum operating junction temperature of a component in the power source, operative to become paramagnetic when the temperature of the core exceeds the Curie temperature of the core;
the control transformer being operative to reduce the inductance of the secondary windings to lower the power supplied to the LED array to prevent the component of the power source from overheating.

7. The LED power source of claim 4, wherein the inverter further comprises:
a resonant circuit which generates an oscillation signal, including a resonant inductance and a resonant capacitance;
first and second switches operatively connected together at a common node to receive the oscillation signal determining the switching rate of the first and second switches;
a first gate control circuit controlling the first switch, the first gate control circuit comprising an inductance operatively connected between the junction of the first and second switches and the gate of the first switch and being coupled to the resonant inductance; and
a second gate control circuit controlling the second switch, the second gate control circuit comprising an inductance operatively connected between the supply-side ground connection and the gate of the second switch and being coupled to the resonant inductance;

wherein the first and second switches induce an AC current in the resonant circuit.

8. An isolated, self-oscillating DC-DC converter comprising:
a supply-side ground connection;
a load-side ground connection electrically isolated from the supply side ground connection;
a self-oscillating inverter operatively coupled to the supply-side ground connection and receiving an initial DC voltage, the inverter operative to produce an intermediate AC signal;
an output rectifier operatively coupled to receive the intermediate AC signal from the inverter and being coupled with the load-side ground connection, the output rectifier operative to produce an output DC voltage to supply power to a load; and
an inverter controller operatively coupled to the inverter to modify a switching frequency of the inverter to control a frequency of the intermediate AC signal to control power supplied to a load based at least in part on a sensed power drawn by the load.

9. The DC-DC converter of claim 8, wherein the inverter controller is electrically isolated from the inverter.

10. The DC-DC converter of claim 8, further comprising a control transformer comprising:
a primary winding operatively coupled to and controlled by the inverter controller;
a secondary winding operative to control the switching frequency of the inverter; and
a core operatively coupled to the primary winding and the secondary windings, the core comprising a core material having a Curie temperature associated with a maximum operating junction temperature of at least one component in the power source the core being operative to become paramagnetic when a temperature of the core exceeds the Curie temperature of the core;
the control transformer being operative to reduce the inductance of the secondary windings to lower the power supplied to the LED array to prevent the component of the power source from overheating.

11. The DC-DC converter of claim 8, further comprising:
a resonant circuit which generates an oscillation signal, including a resonant inductance and a resonant capacitance;
first and second switches operatively connected together at a common node to receive the oscillation signal determining the switching rate of the first and second switches;
a first gate control circuit controlling the first switch, the first gate control circuit comprising: an inductance operatively connected between the junction of the first and second switches and the gate of the first switch and being coupled to the resonant inductance; and
a second gate control circuit controlling the second switch, the second gate control circuit comprising: an inductance operatively connected between the supply-side ground connection and the gate of the second switch and being coupled to the resonant inductance;
wherein the first and second switches induce an AC current in the resonant circuit.

12. A self-oscillating DC-DC converter comprising:
a self-oscillating inverter receiving the initial DC voltage, the inverter operative to produce an intermediate AC signal;
an output rectifier operatively coupled to receive the intermediate AC signal from the inverter, the output rectifier operative to produce an output DC voltage to supply power to a load; and
a control transformer comprising:
a primary winding operatively coupled to and controlled by an inverter controller;
a secondary winding operative to control the switching frequency of the inverter; and
a core operatively coupled to the primary winding and the secondary windings, the core comprising a core material having a Curie temperature associated with a maximum operating junction temperature of at least one component in the inverter and operative to become paramagnetic when a temperature of the core exceeds the Curie temperature of the core;
the control transformer being operative to reduce the inductance of the secondary windings to lower the power supplied to the LED array to prevent the component of the power source from overheating.

13. The self-oscillating DC-DC converter of claim 12, further comprising an inverter controller operatively coupled to the inverter, to modify a switching frequency of the inverter, to control a frequency of the intermediate AC signal to control power supplied to the LED array based at least in part on a sensed power drawn by the LED array.

14. The self-oscillating DC-DC converter of claim 12, wherein the inverter further comprises:
a resonant circuit which generates an oscillation signal, including a resonant inductance and a resonant capacitance;
first and second switches operatively connected together at a common node to receive the oscillation signal determining the switching rate of the first and second switches;
a first gate control circuit controlling the first switch, the first gate control circuit comprising an inductance operatively connected between the junction of the first and second switches and the gate of the first switch and being coupled to the resonant inductance; and
a second gate control circuit controlling the second switch, the second gate control circuit comprising an inductance operatively connected between the supply-side ground connection and the gate of the second switch and being coupled to the resonant inductance;
wherein the first and second switches induce an AC current in the resonant circuit.

15. The LED power source of claim 1, wherein the DC-DC converter further comprises an inverter controller operatively coupled to the inverter, to modify a switching frequency of the inverter, to control a frequency of the intermediate AC signal to control power supplied to the LED array based at least in part on a sensed power drawn by the LED array.

16. The LED power source of claim 15, wherein the inverter controller is electrically isolated from the inverter.

17. The DC-DC converter of claim 8, further comprising a boost converter operatively coupled between an input rectifier and the DC-DC converter, the boost converter receiving the initial DC voltage from the input rectifier and amplifying the initial DC voltage to provide an intermediate DC voltage, the inverter converting the intermediate DC voltage to produce the intermediate AC signal.

18. The DC-DC converter of claim 17, wherein the boost converter further comprises a power factor correction controller to control a power factor of the DC-DC converter.

19. The DC-DC converter of claim 9, further comprising a boost converter operatively coupled between an input rectifier and the DC-DC converter, the boost converter receiving the initial DC voltage from the input rectifier and amplifying the initial DC voltage to provide an intermediate DC voltage, the inverter converting the intermediate DC voltage to produce the intermediate AC signal.

20. The DC-DC converter of claim 18, wherein the boost converter further comprises a power factor correction controller to control a power factor of the DC-DC converter.

* * * * *